United States Patent [19]

Nomura et al.

[11] Patent Number: 4,608,481
[45] Date of Patent: Aug. 26, 1986

[54] METHOD OF AUTOMATICALLY CONTROLLING HEIGHT OF A WELD BEAD

[75] Inventors: Hirokazu Nomura; Yuji Sugitani; Naohiro Tamaoki, all of Tsu, Japan

[73] Assignee: Nippon Kokan Kabushiki Kaisha, Tokyo, Japan

[21] Appl. No.: 716,654

[22] Filed: Mar. 27, 1985

[30] Foreign Application Priority Data

May 28, 1984 [JP] Japan ................................ 59-108150

[51] Int. Cl.⁴ ............................................... B23K 9/12
[52] U.S. Cl. ........................... 219/125.12; 219/124.22; 219/124.34
[58] Field of Search ........... 219/124.1, 124.22, 124.34, 219/125.12

[56] References Cited

U.S. PATENT DOCUMENTS

| | | | |
|---|---|---|---|
| 4,302,655 | 11/1981 | Edling | 219/125.12 |
| 4,394,559 | 7/1983 | Nomura et al. | 219/125.12 |
| 4,477,713 | 10/1984 | Cook et al. | 219/125.12 |
| 4,491,718 | 1/1985 | Cook et al. | 219/125.12 |

FOREIGN PATENT DOCUMENTS 57-3462  1/1982  Japan .

Primary Examiner—Clifford C. Shaw
Attorney, Agent, or Firm—Fleit, Jacobson, Cohn & Price

[57] ABSTRACT

A welding control method in which a deviation of a groove line or variation of a groove width is detected by utilizing the characteristics of a welding arc itself without using a separate sensor and a welding torch is caused to accurately follow the groove line. The oscillation width of the welding torch is detected and the proper welding speed for providing a weld bead of a predetermined height is calculated in accordance with the detected oscillation width thereby automatically controlling the welding speed in accordance with the calculated welding speed value for every cycle of the oscillation or every integral multiple thereof.

3 Claims, 8 Drawing Figures

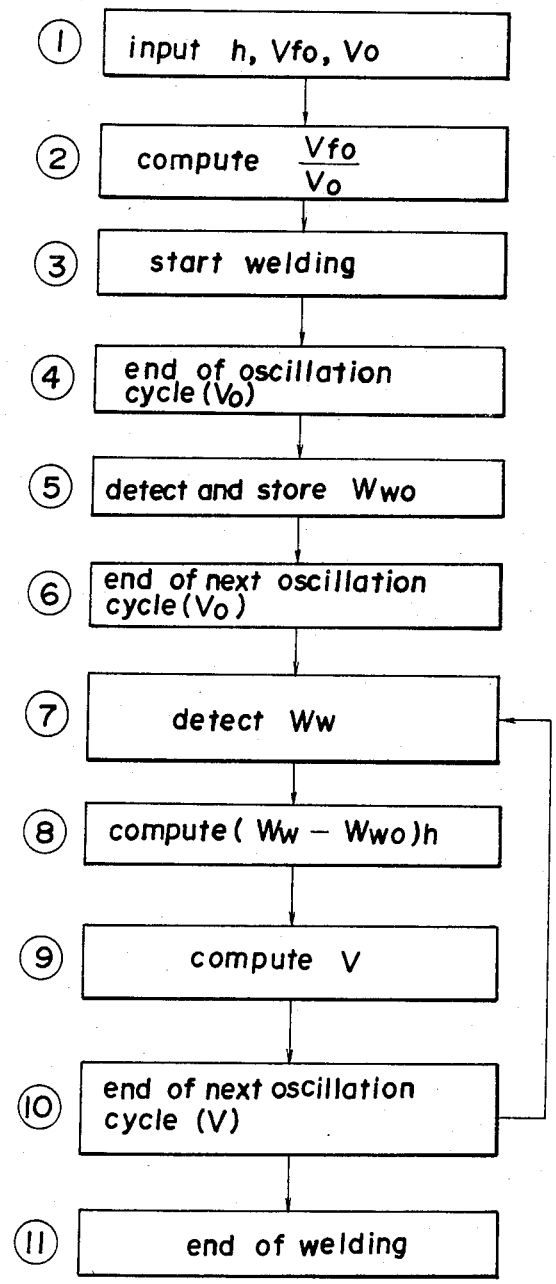

METHOD OF AUTOMATICALLY CONTROLLING HEIGHT OF A WELD BEAD

BACKGROUND OF THE INVENTION

The present invention relates to an automatic arc welding method in which the direction of welding is along the direction of the weld line of a joint to be welded, and more particularly the invention relates to an automatic bead height controlling method for controlling the height of a weld beam at a uniform height.

The realization of an unattended automatic welding requires the use of a position sensor and a welding torch position adjusting mechanism for automatically sensing and correcting the position of the welding torch with respect to the two-dimensional deviation of the groove line which varies from moment to moment during the welding operation.

Various sensors for this purpose have been used in the past and they include the contact-type sensors and the non contact-type sensors of the electromagnetic or optical position sensing type. However, since the use of these sensors requires that a sensor or specific device be positioned as a separate member in the vicinity of the welding torch in addition thereto, it is necessary to maintain a predetermined distance between the sensing position and the welding torch position due to the dimensional limitation and thus from the application point of view there are many limitations in that accurate sensing is not ensured, that there is a limitation to the size of objects to be welded and so on.

Furthere, the welding of joints inevitably involves variations of the groove shapes such as groove width and angle and therefore such variations must be sensed to automatically control the welding conditions. It can be said that there has existed in the past no effective sensing means for this purpose and only a method has been proposed in which the groove in front of the arc is picked up by an ITV to detect the groove width. However, this method has not been put in practical use since it is disadvantageous in that the true groove cross-section is not evident although it is possible to detect the width of the groove surface, that the detection accuracy is in any way limited due to a deviation between the sensing position and the arc position, that there is a limitation to the size of objects to be welded as mentioned previously and so on.

In view of these circumstances, the inventors have proposed a method by Japanese Patent Publication No. 57-3462 in which a welding arc itself oscillated within a groove is used as a sensor and the position of a welding electrode is caused to accurately follow the contour within a groove without using any separate sensor. This method is useful in that not only the welding torch is caused to follow the groove line but also the desired information on the groove cross-section just below the arc is provided by the displacement waveform described by the torch.

SUMMARY OF THE INVENTION

It is the primary object of the present invention to provide an automatic bead height controlling method which uses no separate sensor for the sensing of a groove position, groove cross-sectional shape, etc., but utilizes the characteristics of a welding arc itself to use the welding arc as a sensor such that not only a welding torch is caused to accurately follow a groove line but also the shape of the groove is sensed thereby automatically controlling the welding conditions and always forming an excellent weld bead of a predetermined uniform height irrespective of any variations in the groove conditions.

Thus, the present invention primarily comprises a method in which the displacement of a welding torch obtained by the automatic tracing control method disclosed in the previously mentioned Japanese Patent Publication No. 57-3462 is utilized in such a manner that the width of a groove to which arc is being applied is detected and the welding speed is automatically controlled so as to provide a uniform weld bead of a predetermined height over the whole length of a joint to be welded. In other words, in accordance with the arc welding method of this invention, using as a welding power source a power source having a dc or ac constant current characteristic or a dc or ac constant voltage characteristic, the distance from the forward end of a welding electrode to the surface of a base metal is varied by a mechanism for moving the welding electrode in the axial direction (hereinafter referred to as a Y axis) so as to maintain a predetermined constant arc voltage or welding current and thereby always maintain an arc length constant and also simultaneously with this control operation the welding electrode is moved in the width direction of a groove (hereinafter referred to as an X axis) such that the direction of the X-axis movement is reversed on condition that the said distance has attained a predetermined value. Thereafter, this operation is performed repeatedly. As a result of the repetition of the operation, the arc at the electrode end is oscillatory reciprocated in the width direction of the groove so that the groove is traced accurately and the height from the surface of the base metal to the extremities of the reciprocating oscillation is always maintained uniform. In this case, the interval of time from one extremity to the other extremity of the oscillation represents one cycle and during the period of one cycle or the period of an integral multiple of the cycle the X-axis direction width of the oscillation or the oscillation width or its average value is detected and stored. Then, in accordance with the stored oscillation width or the average value, a predetermined bead height value and the wire feed speed, the desired welding speed for the period of the next one cycle or the next integral multiple cycles of the oscillation is determined and executed. Then, this control operation is performed repeatedly and the height of the weld bead within the groove is maintained constant.

More specifically, in accordance with a first method of this invention the welding speed V is obtained on the basis of a detected value of oscillation width Ww and such presetable parameters as a desired bead height h, a distance $\Delta h$ between a bead surface and an oscillation reversing position, a wire feed speed Vf, a groove angle $\theta$ and an X-axis distance $\Delta W$ between the electrode end and the groove wall at the oscillation extremity. In other words, the cross-sectional area A of the deposited metal is obtained from the values of Ww, h, $\Delta h$, $\theta$ and $\Delta W$. Then, the welding speed V is determined in accordance with the cross-sectional area A and the wire feed speed Vf. In this calculation, only Ww is a variable and the others are constants.

In accordance with a second method of this invention, the welding speed V is obtained in accordance with an oscillation width Wwo during the period of the preceding cycle of the oscillation, an oscillation width Ww during the period of the current oscillation cycle, a desired bead height h, a wire feed speed Vfo and a welding speed initial set value Vo. Note that in this calculation, Wwo and Ww are variables and the others are constants.

Thus, in accordance with the control method of this invention, any deviation of a groove line or variation of a groove width is detected by utilizing the characteristics of a welding arc itself so that a welding torch is caused to accurately follow the groove line and also the proper welding speed for providing a weld beam of a predetermined height is automatically controlled in accordance with the oscillation width of the welding torch for every cycle of the oscillation or every integral multiple of the cycle.

Other objects and advantages of the invention will be apparent from the following description, the appending claims and the accompanying drawings.

BRIEF DESCRIPTION OF THE DRAWINGS

FIG. 7 is an example of flow chart showing the control operation of the method according to the embodiment.

DESCRIPTION OF THE PREFERRED EMBODIMENTS

Figure 1:
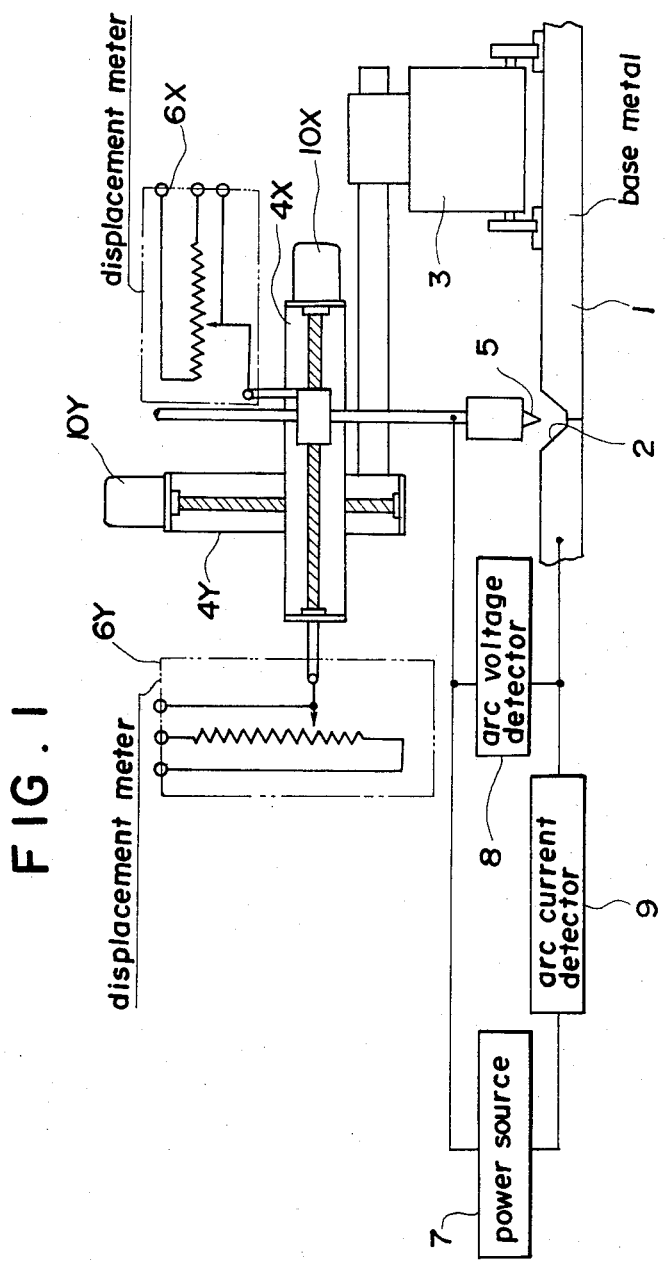
FIG. 1 is a schematic diagram showing by way of example the principal construction of a welding apparatus for performing a method according to the invention.

As shown in FIG. 1, a welding apparatus for carrying out the present invention is designed so that a welding traveller 3 is movable along a groove 2 of base metals 1 to be welded together, and a welding electrode 5 supported on the welding traveller 3 through vertical-direction (Y-axis) and groove width-direction (X-axis) driving mechanisms 4Y and 4X is moved in the direction of the groove line while oscillating it in the width direction within the groove. At the same time, a displacement meter 6Y comprising a potentiometer or the like detects the displacement in the Y-axis direction of the electrode 5 which is controlled to maintain the arc length constant. Also, a displacement meter 6X comprising a potentiometer or the like detects the X-axis direction displacement of the electrode 5 in its oscillation in the groove width direction. The electrode 5 may be either a consumable electrode or a non-consumable electrode. A welding power source 7 is connnected between the electrode 5 and the base metal 1 and the power source 7 comprises a constant current source or a constant voltage source depending on the welding application. Numeral 8 designates an arc voltage detector, and 9 an arc current detector. These detectors are provided only when they are required from the control point of view.

Figure 2:
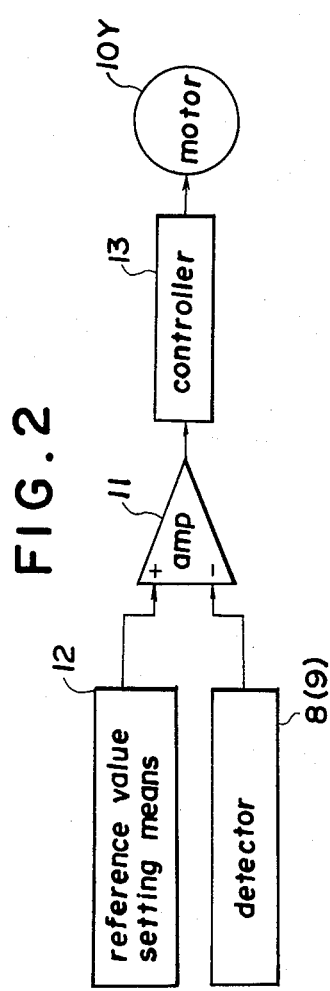
FIG. 2 is a block diagram showing a basic circuit for the constant arc length control by the Y-axis motor in the welding apparatus of FIG. 1.

The basis of the control method according to the invention consists in a constant arc length controlling oscillatory welding which is performed by causing the electrode 5 to make reciprocating oscillations in the width direction (X axis) within the groove 2 and simultaneously moving the electrode 5 in the height direction (Y axis) so as to always maintain the arc length constant. The electrode 5 is oscillated in the X-axis direction by the driving mechanism 4X which is driven by an X-axis motor 10X and the movement of the electrode 5 in the Y-axis direction is effected by the driving mechanism 4Y which is driven by a Y-axis motor 10Y. While, in the illustrated embodiment, the driving mechanism 4X supporting the electrode 5 so as to be moved in the X axis direction is supported on the driving mechanism 4Y so as to be moved in the Y-axis direction and the driving mechanism 4Y is supported on the traveller 3, the invention is not limited in any way to the described supporting relation. A basic circuit for constant arc length controlling purposes is constructed as shown in FIG. 2 so that a differential amplifier 11 is supplied with the arc voltage from the arc voltage detector 8 if the power source 7 is a constant current source and it is supplied with the arc current from the arc current detector 9 if the power source 7 is a constant voltage source. Thus, the amplifier 11 generates the difference between the input and the reference value preset into setting means 12, and there is provided a drive controller 13 which drives the Y-axis motor 10Y at the speed corresponding to the difference output. This circuit maintains the arc voltage (or the arc current) constant thereby maintaining the arc length constant and the forward end of the electrode 5 is moved along the groove wall as it is moved in the X-axis direction.

Figure 3:
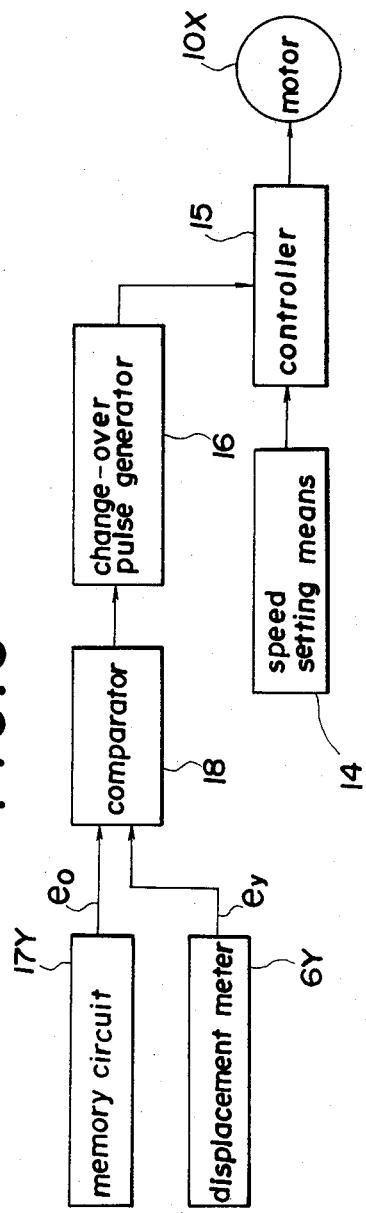
FIG. 3 is a block diagram showing a control circuit of the X-axis motor in the welding apparatus of FIG. 1.

This electrode movement in the X-axis direction is controlled by the drive control circuit shown in FIG. 3. More specifically, in FIG. 3, the X-axis motor 10X is adapted to be operated through a controller 15 at a constant speed preset by setting means 14 and the direction of rotation of the X-axis motor 10X is reversed each time the controller 15 receives a signal from a change-over pulse generator 16. The Y-axis displacement $e_y$ of the electrode 5 detected by the displacement meter 6Y is compared with an end position set value $e_o$ preset and stored in a memory 17 by a comparator 18 so that each time the equality is found between $e_y$ and $e_o$, a change-over command signal is applied to the controller 15 from the change-over pulse generator 16 in response to a signal generated from the comparator 18.

Figure 4A:
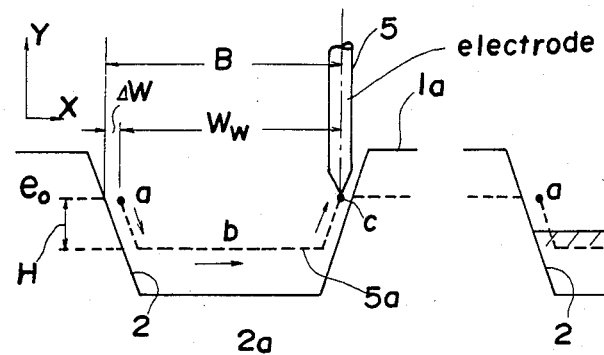
FIGS. 4A and 4B are diagrams for explaining a method according to an embodiment of the invention.
Figure 4B:
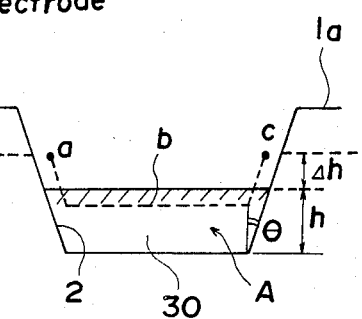

FIG. 4A shows the manner in which the electrode 5 is moved by the apparatus of FIG. 1 including the control systems of FIGS. 2 and 3, and FIG. 4B shows by way of example a positional relation between the resulting deposited metal and the electrode forward end. In these Figures, numeral 5a shows the path of the electrode forward end, 1a the surface of the base metal, 2a the groove root, and 30 the deposited metal.

In FIG. 4A, the electrode 5 is first positioned at one end (a) of the groove, for example. The Y-axis displacement at this time is stored as $e_o$. When an arc is generated and the electrode 5 is started to move in the X-axis direction, in accordance with the previously mentioned constant arc length control, the electrode forward end is practically moved along the walls of the groove through the points (a), (b) and (c) in the Figure and the path 5a of the electrode forward end is obtained. When the other end (c) is reached, the output $e_y$ of the displacement meter 6Y again becomes $e_o$ and therefore the direction of the X-axis movement is reversed by the operation of the control circuit of FIG. 3. Thereafter, this operation is performed repeatedly.

Here, the period of time from one extremity (a;c) to the other extremity (c;a) of the oscillation is assumed to represent one cycle of the oscillation. In accordance with this control method, even if the groove shape is changed in any way or even if the center of the groove deviates from the direction of movement of the welding traveller, the forward end of the electrode always repeats its reciprocating oscillation within the groove width while maintaining a predetermined distance from the base metal surface or the groove root.

During each cycle of the oscillation, the oscillation width Ww that can be detected by the X-axis displacement meter is related to a groove width B at the oscillation reversing position (the $e_o$ point) as shown by the following equation.

$$B = Ww + 2\Delta W \quad (1)$$

In the equation (1), $\Delta W$ is the distance between the electrode forward end and the groove wall at the oscillation extremity and basically it is a constant which is determined by an arc length which is to be present. Thus, its value is not varied with variation of the groove width if the present values of the welding current and the arc voltage are constant and this has been confirmed by experiments.

On the other hand, if Vf represents the wire feed speed, V the welding speed and A the cross-sectional area of the resulting deposited metal 30 during each cycle of the oscillation, the following relation holds $$Vf = A \cdot V \quad (2)$$

If $\Delta h$ ($\Delta h = e_o - h$) represents the distance between the bead surface and the oscillation reversing position, h the bead height and $\theta$ the groove angle, then the following holds $$A = \{(Ww + 2\Delta W) - 2\Delta h \cdot \tan\theta - h \cdot \tan\theta\}h \quad (3)$$

The equation (3) shows that if the depth of the groove (or the plate thickness) and the groove angle $\theta$ are constant, the desired cross-sectional A of a deposited metal which always ensures a predetermined bead height despite variations in the groove width can be obtained by calculation in accordance with the value of the detected oscillation width Ww.

Thus, by preliminarily inputting a groove angle $\theta$, a desired bead height h, a wire feed speed Vf determined by the welding current and the constant $\Delta W$ into a computing unit such as a microcomputer before starting the welding, the proper welding speed V can be obtained in accordance with the oscillation width Ww detected during each cycle of the oscillation.

Next, a more simplified embodiment for calculating the proper welding speed will be described. Generally and not limiting to such grooves as shown in FIGS. 4A and 4B, the welding conditions including the welding speed, welding current, wire feed speed, etc., are predetermined as initial values in accordance with the shape of a groove and thereafter the welding conditions are changed in accordance with variations of the groove width. In accordance with this method, if the initial values or the wire feed speed and the welding speed are respectively represented by Vfo and Vo and if the welding is started under these conditions, after one cycle of the oscillation the cross-sectional area Ao of the resulting deposited metal is given as follows:

$$Ao = \frac{Vfo}{Vo} \quad (4)$$

Also, the oscillation width under this condition is represented by Wwo. Assume now that the groove width is varied during the next cycle of the oscillation so that the groove width is for example increased and changed to Ww. In this case, in order to ensure a predetermined bead height h, the deposition cross-sectional area must be increased by an amount $\Delta A - Ao$. In other words, in the equation (3) all the parameters excluding Ww are constants and thus the following holds $$\Delta A = A - Ao = (Ww - Wwo)h \quad (5)$$

Therefore, the welding speed V required for ensuring the predetermined bead height h is given by the following equation in accordance with the equation (4) and (5).

$$V = \frac{Vfo}{A} = \frac{Vfo}{Ao - \Delta A} \quad (6)$$
$$= \frac{Vfo}{\frac{Vfo}{Vo} + (Ww - Wwo)h}$$

Where the equation (6) is used, by predetermining a desired bead height h for a groove having a varying groove width, it is possible to compute the proper welding speed V for the next oscillation cycle in accordance with the initial welding speed Vo and wire feed speed Vfo predetermined before the welding and the change in the detected value of the oscillation width during each cycle or the value of Ww−Wwo.

Figure 5:
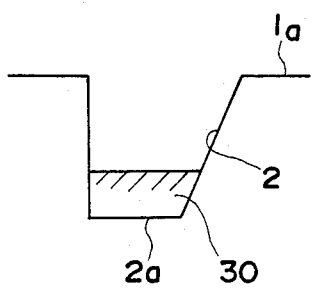
FIGS. 5 and 6 are diagrams for explaining another groove shapes to which the method of this invention is applicable.
Figure 6:
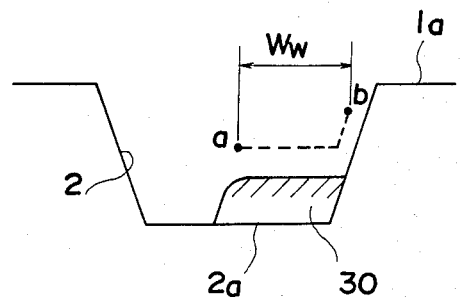

Since this method is applicable irrespective of the preset value of the groove angle if only the groove angle is constant or it is not varied considerably, the method is not limited to the groove shape of FIGS. 4A and 4B and it is also applicable for example to such unsymmetrical grooves as shown in FIG. 5. Also, where the welding is made in part as shown in FIG. 6, the method can still be applied by preliminarily establishing the X-axis position of one extremity a of the oscillation.

FIG. 7 shows an example of the flow chart for the control operations performed when the welding speed control is effected by a microcomputer in accordance with the equation (6). At a step 1, a desired weld bead height h, an initial value Vo of the welding speed and a preset value Vfo of the wire feed speed are first inputted and stored. At a step 2, the value of Ao=Vfo/Vo is computed and stored, At a step 3, the welding is started. In this case, the required oscillation control is performed in accordance with the mechanisms and the control circuits of FIGS. 1 to 3. After one cycle of the oscillation has been completed at a step 4, the resulting oscillation width Wwo is detected at a step 5. After the next oscillation has been started in the like manner and then completed at a step 6, the resulting oscillation width Ww is detected at a step 7. Note that the welding speed up to the present is Vo. Then, the value of (Ww−Wwo)h is calculated at a step 8 and then the proper welding speed V is calculated in accordance with the equation (6) relating thereto at a step 9. At a step 10, the proper welding speed V is used for the first time and the next oscillation cycle is started. Thereafter, the operations of the steps 7 to 10 are repeated and then the welding is completed at a step 11.

What is claimed is:

1. In an arc welding method for effecting welding by reciprocatorily oscillating a welding electrode in a width direction within a groove of a pair of metals to be welded which comprises performing a control operation of varying a distance between a forward end of said electrode and a base metal surface by means for driving said welding electrode in an axial (Y-axis) direction so as to maintain a predetermined welding current or arc voltage and thereby always maintain an arc length constant, moving, simultaneously therewith, said electrode in a width (X-axis) direction of said groove and reversing the direction of said X-axis direction movement when said distance reaches a predetermined value, and thereafter repeating said operations such that the arc at said electrode forward end is caused to accurately follow said groove while being reprocatorily oscillated in the width direction within said groove and a height from said base metal surface or a root of said groove to each extremity of said reciprocating oscillation is always maintained uniform, a method of automatically controlling the height of a weld bead comprising the steps of:

detecting an oscillation width Wwo during a period of a preceding cycle of said oscillation and an oscillation width Ww during a period of a current cycle;

obtaining a welding speed V in accordance with said oscillation widths Wwo and Ww, a desired bead height h, a wire feed speed Vfo and a welding speed initial set value Vo $$V = \frac{vfo}{\frac{Vfo}{Vo} + (Ww - Wwo)h} \; ;$$

executing said welding speed V during the next oscillation cycle; and repeating thereafter said operations.

2. A method according to claim 1, wherein one groove angle and the other groove angle of said groove are equal to each other and said groove angles are substantially constant angles with respect to the direction of welding line.

3. A method according to claim 1, wherein one groove angle and the other groove angle are different from each other and each of said groove angles is substantially a constant angle with respect to the direction of welding line.

* * * * *